United States Patent
Kinose (10) Patent No.: US 6,877,482 B2
(45) Date of Patent: Apr. 12, 2005

(54) KNOCK CONTROL APPARATUS AND KNOCK CONTROL METHOD FOR INTERNAL COMBUSTION ENGINE

(75) Inventor: Kenichi Kinose, Okazaki (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 10/692,790

(22) Filed: Oct. 27, 2003

(65) Prior Publication Data

US 2004/0084022 A1 May 6, 2004

(30) Foreign Application Priority Data

Oct. 31, 2002 (JP) ........................................ 2002-318050

(51) Int. Cl.$^7$ .............................................. F02P 5/152
(52) U.S. Cl. ............................ 123/406.29; 73/35.03; 701/111
(58) Field of Search ....................... 123/406.21, 406.29, 123/406.37–406.39; 73/35.03–35.06; 701/111

(56) References Cited

U.S. PATENT DOCUMENTS

| 5,092,160 A | | 3/1992 | Ueda | |
|---|---|---|---|---|
| 5,230,316 A | * | 7/1993 | Ichihara et al. | 123/406.38 |
| 6,701,894 B2 | * | 3/2004 | Katagami | 123/406.39 |
| 6,779,517 B2 | * | 8/2004 | Sakakura | 123/630 |
| 2002/0195085 A1 | | 12/2002 | Katagami | |

FOREIGN PATENT DOCUMENTS

| DE | 29 18 410 A1 | 11/1980 |
|---|---|---|
| DE | 29 18 420 A1 | 11/1980 |
| EP | 0 454 486 A2 | 10/1991 |
| JP | 61-18838 A | 1/1986 |
| JP | 6-280728 A | 10/1994 |
| JP | 11-229951 A | 8/1999 |
| WO | WO 99/31384 | 6/1999 |

* cited by examiner

*Primary Examiner*—Tony M. Argenbright
(74) *Attorney, Agent, or Firm*—Kenyon & Kenyon

(57) ABSTRACT

The invention provides such a knock control apparatus or method for an internal combustion engine as is capable of suitably avoiding an erroneous determination on the occurrence of knocking and controlling knocking. This control apparatus comprises a knock determiner, a controller, and a setter. If an intensity of engine oscillation detected during a predetermined knock determination period is equal to or higher than a predetermined knock determination level, the knock determiner determines that knocking has occurred. The controller controls an ignition timing on the basis of a result of the determination. The setter sets an end timing of the knock determination period at an advanced timing on the basis of the ignition timing retardation amount in the retardation control.

20 Claims, 8 Drawing Sheets

KNOCK CONTROL APPARATUS AND KNOCK CONTROL METHOD FOR INTERNAL COMBUSTION ENGINE

INCORPORATION BY REFERENCE

The disclosure of Japanese Patent Application No. 2002-318050 filed on Oct. 31, 2002, including the specification, drawings, and abstract thereof, are incorporated herein by reference in their entirety.

BACKGROUND OF THE INVENTION

1. Field of the Invention

The invention relates to a knock control apparatus/method for an internal combustion engine which determines that knocking has occurred if the intensity of engine oscillation detected during a predetermined knock determination period is equal to or higher than a predetermined knock determination level and which performs retardation control of ignition timing on the basis of a result of the determination.

2. Description of the Related Art

In an apparatus of this kind, as a rule, a knock determination period for detecting engine oscillation resulting from combustion of a mixture is determined in advance, and a peak value of the engine oscillation is detected while the engine oscillation is monitored during the knock determination period. If this peak value is larger than a preset knock determination level, it is determined that knocking has occurred. In addition, if it is thus determined that knocking has occurred, an ignition timing is generally controlled so as to be retarded.

There is also known an apparatus that corrects a knock determination period in accordance with an engine operational state so as to make the knock determination period coincident with a knocking occurrence period.

For an internal combustion engine equipped with a variable valve timing mechanism that variably sets timings for opening and closing engine valves in accordance with an engine operational state, there is also available an apparatus that corrects a knock determination period in accordance with timings for opening and closing the engine valves and that prevents engine oscillation from being caused by the sitting of the valves during the knock determination period.

In a reciprocating engine, because of its structure, pistons disposed therein change in posture while making reciprocal movements. As a result, engine oscillation may be caused.

Figure 9A:
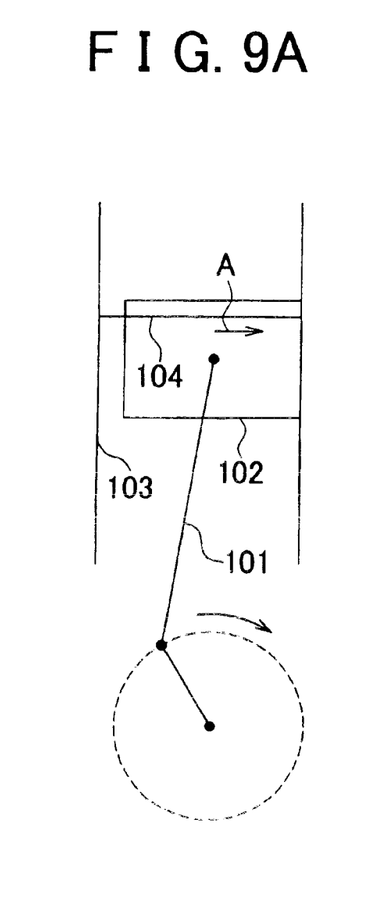
FIGS. 9A–9D are schematic views for explaining a mechanism by which oscillation of an engine occurs as a result of swinging movements of a piston.

A mechanism by which this engine oscillation is caused will be described hereinafter with reference to FIG. 9. First of all in a compression stroke, as shown in FIG. 9(a), a connecting rod 101 presses a piston 102 upwards with respect to an engine from a diagonally low region (from a diagonally left-low region in FIG. 9(a)). At this moment, while being pressed upwards with respect to the engine, the piston 102 is pressed onto an inner wall of a cylinder 103 by a force acting in a radial direction of the cylinder (to the right in FIG. 9(a)) indicated by an arrow A in FIG. 9(a), as a result of inclination of the connecting rod 101.

Figure 9B:
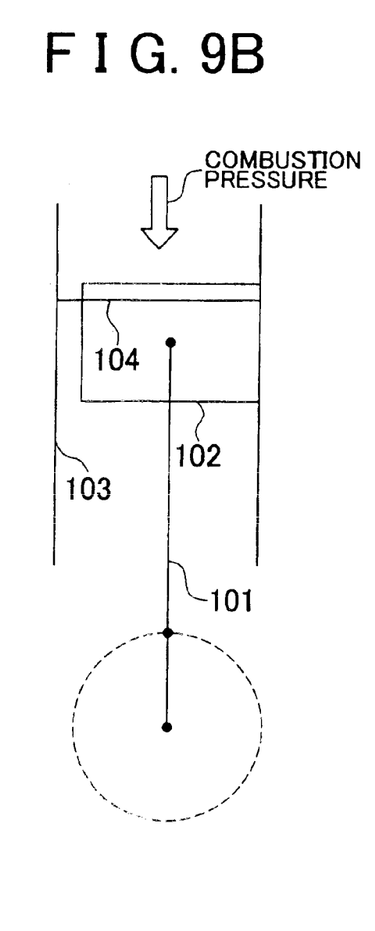

Then, as the piston 102 approaches a compression top dead center (a position shown in FIG. 9(b)), a high combustion pressure is applied to a piston ring 104. Thus, the piston ring 104 is pressed hard against the piston 102. A frictional force applied to a sliding face between the piston ring 104 and the piston 102 inhibits the piston 102 from being displaced in the radial direction of the cylinder.

Figure 9C:
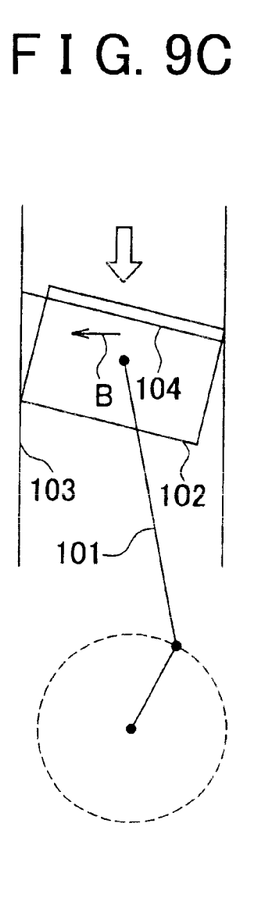

Then, upon a shift to an expansion stroke, the piston 102 is pressed downwards by a combustion pressure. At this moment, as shown in FIG. 9(c), the direction of inclination of the connecting rod 101 is opposite to the direction of inclination thereof in the aforementioned compression stroke. Hence, as a result of this inclination, a force acting in the radial direction of the cylinder (to the left in FIG. 9(c)) indicated by an arrow B in FIG. 9(c) is applied to the piston 102. At this moment, since the piston ring 104 inhibits an upper portion of the piston 102 from being displaced in the radial direction of the cylinder, the upper portion of the piston 102 remains still. Only a lower portion of the piston 102, which is not inhibited from being displaced, is pressed onto the inner wall of the cylinder 103.

Figure 9D:
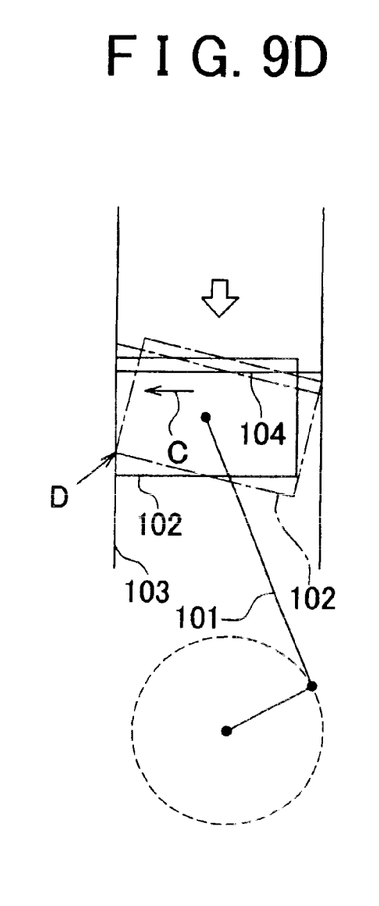

Then in an intermediate period of the expansion stroke, as shown in FIG. 9(d), the pressure of combustion decreases as the piston 102 moves downwards with respect to the engine. This leads to a gradual decrease in a binding force exerted by the piston ring 104 to inhibit the piston 102 from being displaced in the radial direction of the cylinder. On the other hand, the angle of inclination of the connecting rod 101 gradually increases, which also leads to a gradual increase in the force applied to the piston 102 in the radial direction of the cylinder as indicated by an arrow C in FIG. 9(d). As soon as this force exceeds the binding force exerted by the piston ring 104, the upper portion of the piston 102 instantaneously rotates from a state indicated by alternate long and short dash lines in FIG. 9(d) to a state indicated by solid lines in FIG. 9(d), around a point (point D) that is in contact with the inner wall of the cylinder 103. Hereinafter, the rocking of the piston thus caused in an intermediate period of an expansion stroke will be referred to as "swinging movements". Because of the swinging movements, the piston 102 collides with the inner wall of the cylinder 103. At this moment, engine oscillation occurs.

As described hitherto in detail, the swinging movements are caused while the pressure of combustion falls in an expansion stroke, namely, in the vicinity of an end timing of the aforementioned knock determination period. Hence, if the magnitude of engine oscillation resulting from the swinging movements increases, it may be erroneously determined that knocking has occurred, despite the absence of knocking.

SUMMARY OF THE INVENTION

A knock control apparatus for an internal combustion engine is provided as a first aspect of the invention. This control apparatus comprises a knock determiner, a retardation amount controller, and a setter. The knock determiner determines that knocking has occurred, if an intensity of engine oscillation detected during a predetermined knock determination period is equal to or higher than a predetermined knock determination level. The retardation amount controller controls a retardation amount of ignition timing on the basis of a result of the determination. The setter sets an end timing of the knock determination period at an advanced timing on the basis of the ignition timing retardation amount controlled by the controller.

According to another aspect of the invention, a knock control method for an internal combustion engine is provided. This control method comprises the steps of determining that knocking has occurred if an intensity of engine oscillation detected during a predetermined knock determination period is equal to or higher than a predetermined knock determination level, controlling a retardation amount of ignition timing on the basis of a result of the determination, and setting an end timing of the knock determination period at an advanced timing on the basis of the ignition timing retardation amount controlled in the above step.

According to the control apparatus mentioned above and the control method mentioned above, the end timing of the knock determination period is set at an advanced timing on the basis of an ignition timing retardation amount. Thus, a determination on knock can be terminated before the magnitude of engine oscillation resulting from swinging movements increases. As a result, an erroneous determination on knocking can be prevented from being made due to the engine oscillation.

BRIEF DESCRIPTION OF THE DRAWINGS

The above-mentioned construction and other constructions, objects, features, advantages, technical and industrial significance of this invention will be better understood by reading the following detailed description of the exemplary embodiments of the invention, when considered in connection with the accompanying drawings, in which.

DETAILED DESCRIPTION OF THE PREFERRED EMBODIMENTS

In the following description and the accompanying drawings, the invention will be described in more detail in terms of exemplary embodiments. Modes of implementing the invention will be described below on the basis of the embodiments thereof.

(First Embodiment)

A knock control apparatus for an internal combustion engine in accordance with the first embodiment of the invention will be described hereinafter.

First of all, overall constructions of the internal combustion engine to which the knock control apparatus in accordance with the first embodiment is applied and peripheral units thereof will be described with reference to FIG. 1.

Figure 1:
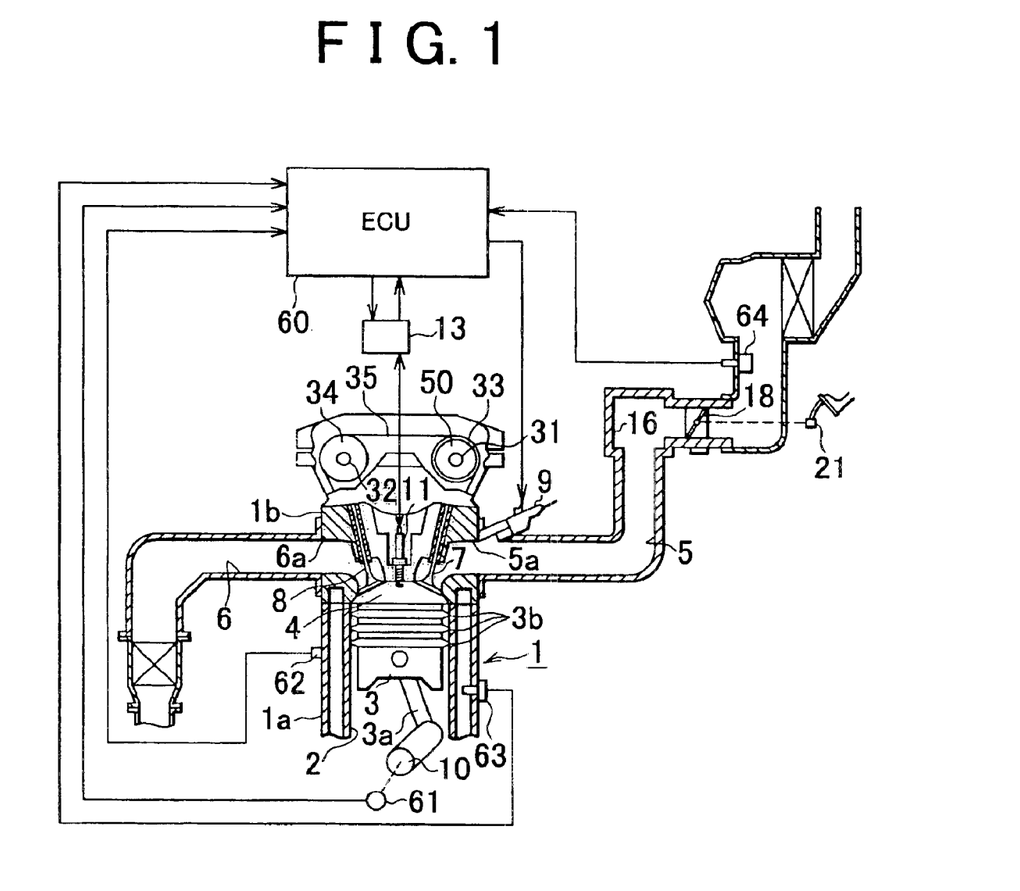
FIG. 1 is a block diagram showing an overall construction of a first embodiment of the invention.

As shown in FIG. 1, an internal combustion engine 1 is provided with a cylinder block 1a having a cylinder 2 and with a cylinder head 1b. A piston 3, which is vertically movably provided in the cylinder 2, is coupled to a crank shaft 10 via a connecting rod 3a. The crank shaft 10 is an output shaft of the internal combustion engine 1. A combustion chamber 4 is defined by a space surrounded by the piston 3 and the cylinder head 1b inside the cylinder 2. The piston 3 has piston rings 3b. Entire outer peripheral faces of the piston rings 3b are pressed onto an inner peripheral face of the cylinder 2, whereby combustion gas is inhibited from leaking to the outside of the combustion chamber 4.

An ignition plug 11 is provided in the cylinder head 1b in such a manner as to correspond to the combustion chamber 4. The cylinder head 1b is provided with an intake port 5a leading to the combustion chamber 4 and an exhaust port 6a leading to the combustion chamber 4. An intake passage 5 is connected to the intake port 5a, and an exhaust passage 6 is connected to the exhaust port 6a. An intake valve 7 is provided in an opening end of the intake port 5a, and an exhaust valve 8 is provided in an opening end of the exhaust port 6a. The opening end of the intake port 5a and the opening end of the exhaust port 6a lead to the combustion chamber 4. The intake valve 7 is driven in opening and closing directions thereof by an intake cam shaft 31 that rotates by power of the crank shaft 10, and the exhaust valve 8 is driven in opening and closing directions thereof by an exhaust cam shaft 32 that rotates by power of the crank shaft 10. Power of the crank shaft 10 is transmitted to the intake cam shaft 31 via a timing belt 35 and a timing pulley 33, and to the exhaust cam shaft 32 via the timing belt 35 and a timing pulley 34.

An injector 9 for injecting fuel is provided in the vicinity of the intake port 5a. Fuel is supplied to the injector 9 via a fuel supply system (not shown).

If operation of the internal combustion engine 1 is started, fuel is injected from the injector 9 while intake air is introduced into the intake passage 5. The intake air and the fuel are thereby mixed and become a mixture. The intake port 5a is opened by the intake valve 7 during a suction stroke of the internal combustion engine 1, whereby the mixture is introduced into the combustion chamber 4 through the intake port 5a. Thereafter, the mixture that has been introduced into the combustion chamber 4 is ignited by the ignition plug 11, explodes, and burns, whereby a driving force is delivered to the internal combustion engine 1. The exhaust port 6a is opened by the exhaust valve 8, whereby exhaust gas generated after combustion is discharged to the exhaust passage 6. The ignition plug 11 performs an ignition operation in accordance with a timing when a high voltage is applied to the ignition plug 11 from an igniter 13.

A surge tank 16 is provided in the intake passage 5. A throttle valve 18, which is driven in opening and closing directions thereof in accordance with an operation of the accelerator pedal 21, is provided upstream of the surge tank 16. An amount of intake air to be introduced into the intake passage 5 is adjusted in accordance with an opening of the throttle valve 18.

Various sensors are provided in the knock control apparatus of the first embodiment to detect an operational state of the internal combustion engine 1. That is, a crank sensor 61 for detecting a rotational phase (crank angle) or a rotational speed (engine rotational speed NE) of the crank shaft 10 is provided in the vicinity thereof. The internal combustion engine 1 is provided with a knock sensor 62 that outputs a signal corresponding to an intensity of engine oscillation. In addition, the internal combustion engine 1 is also provided with a coolant temperature sensor 63 for detecting a temperature THW of engine coolant, an air flow meter 64 for detecting an intake air amount GA, and the like.

Further, this apparatus is provided with an electronic control unit 60 that is so constructed as to include, for example, a microcomputer. Output signals of the sensors 61 to 64 are delivered to the electronic control unit 60. The electronic control unit 60 performs various calculations on the basis of those signals, and performs various control operations regarding the internal combustion engine 1 on the basis of results of the calculations.

In the apparatus of the first embodiment, as components for performing the engine control operations as mentioned above, a retardation amount controller (hereinafter referred to as a "controller") that controls an ignition timing (retardation amount) through drive control of the igniter 13, a knocking determiner that determines whether or not knocking has occurred, a setter that sets an end timing of a knock determination period on the basis of an ignition timing retardation amount controlled by the later-described controller, and the like are provided in the electronic control unit 60. The respective control operations will be described hereinafter. First of all, ignition timing control performed by the controller 60 will now be described.

In the knock control apparatus of the first embodiment, basically, after a basic ignition timing Abse has first been calculated on the basis of an operational state of the engine, the basic ignition timing Abse is corrected via the controller 60, for example, in accordance with a circumstance in which knocking occurs. The basic ignition timing Abse is thus set as a required ignition timing Acal as a control target.

Figure 2:
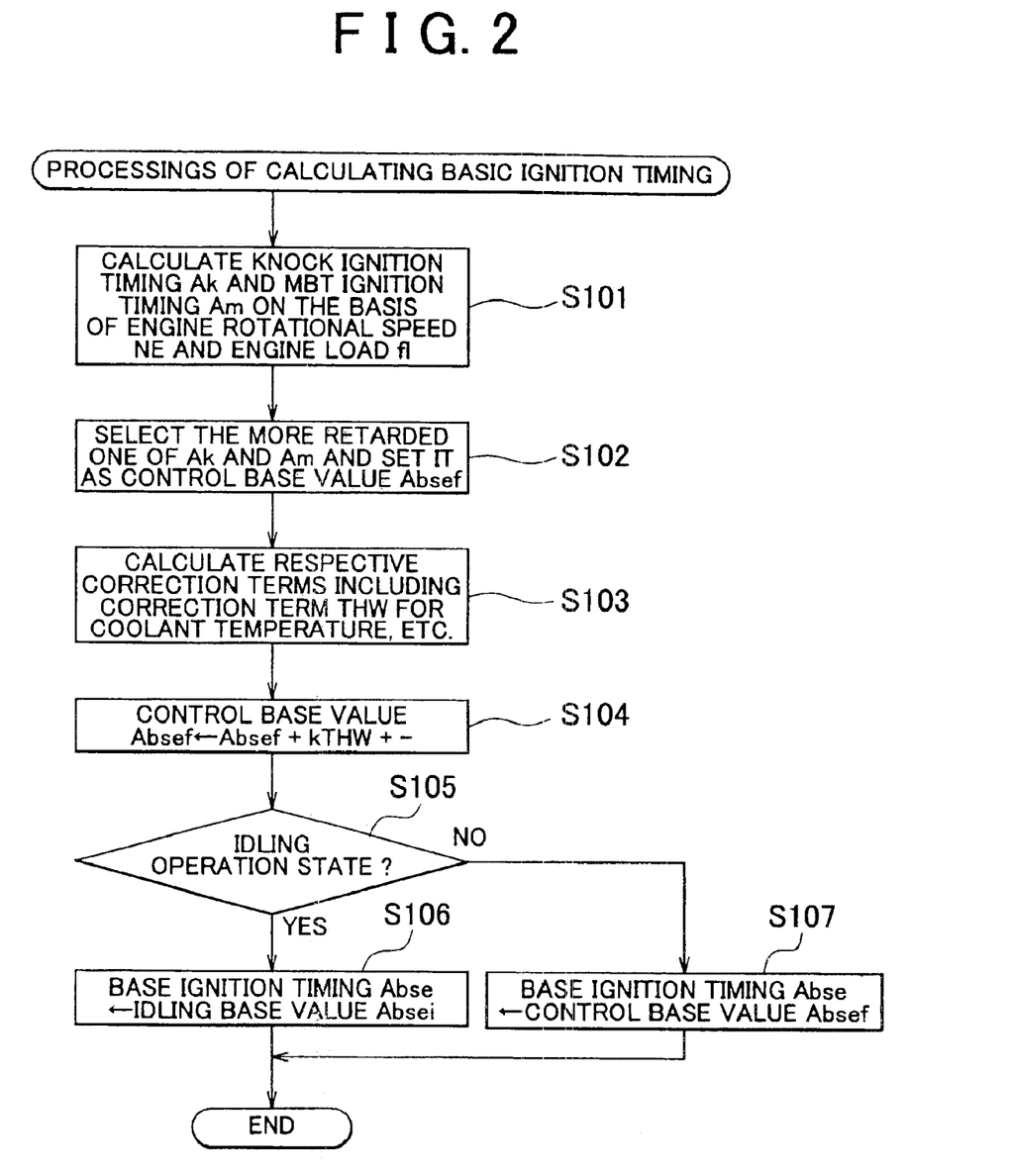
FIG. 2 is a flowchart showing a procedure of processings of calculating a basic ignition timing.
Figure 3:
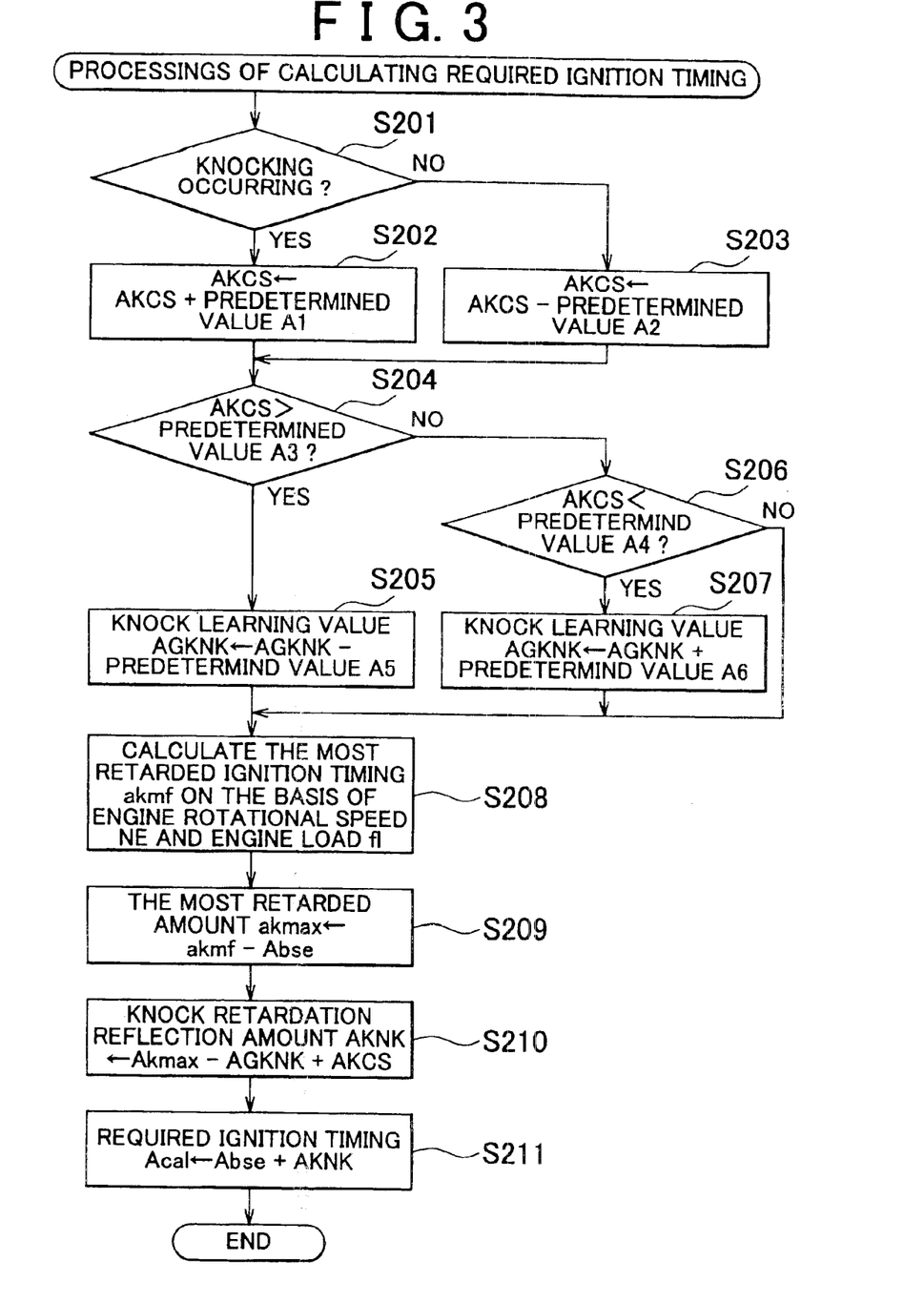
FIG. 3 is a flowchart showing a procedure of processings of calculating a required ignition timing.

Detailed processings of calculating a basic ignition timing Abse as mentioned above and detailed processings of calculating a required ignition timing Acal will be described with reference to FIGS. 2 and 3. FIG. 2 shows a procedure of the processings of calculating a basic ignition timing Abse. FIG. 3 shows a procedure of the processings of calculating a required ignition timing Acal. These processings are all performed by the electronic control unit 60 as an interruption routine to be executed at intervals of a predetermined period.

As shown in FIG. 2, in the aforementioned processings of a basic ignition timing Abse, an engine load fl is first calculated on the basis of an engine rotational speed NE and an intake air amount GA. On the basis of the engine load fl and the engine rotational speed NE, a knock ignition timing Ak and an MBT (minimum advance of the best torque) ignition timing Am are calculated by means of a map (step S101). As the aforementioned knock ignition timing Ak, a critical ignition timing which is capable of suppressing the occurrence of knocking and which is determined in accordance with an engine rotational speed NE and an engine load fl is set. As the aforementioned MBT ignition timing Am, an ignition timing which corresponds to an optimal engine output torque and an optimal specific fuel consumption and which is determined in accordance with an engine rotational speed NE and an engine load fl is set.

The more retarded one of the knock ignition timing Ak and the MBT ignition timing Am is then selected. The selected timing is set as a control base value Absef (step S102).

Then, various correction terms including a correction term kTHW for coolant temperature and the like are calculated (step S103). Furthermore, the aforementioned control base value Absef is corrected by the correction term kTHW or the like as indicated by a formula shown below (step S104).

$$Absef \leftarrow Absef + kTHW + \ldots \quad (1)$$

It is then determined on the basis of an operational state of a vehicle (not shown) such as an engine rotational speed NE, a depression stroke of an accelerator pedal 21, or the like whether or not the vehicle is in an idling operation state (step S105).

If it is determined that the vehicle is in an idling operation state (YES in step S105), the base ignition timing Abse is set as an idling base value Absei, which has been calculated in a processing different from the aforementioned one (step S106). Then, the present routine is temporarily terminated. The idling base value Absei is also set in advance according to a procedure similar to the procedure of setting the aforementioned control base value Absef, after an MBT ignition timing and a knock ignition timing which are suited for an idling operation state have been calculated.

On the other hand, if it is determined that the vehicle is not in an idling operation state (NO in step S105), the control base value Absef calculated as described above is set as the base ignition timing Abse (step S107). Then, the present routine is temporarily terminated.

After the base ignition timing Abse has thus been calculated, the processings of calculating a required ignition timing Acal as shown in FIG. 3 are performed. In these processings, as shown in FIG. 3, it is determined through knock determination processings performed by the knock determiner 60 to be described later in detail whether or not the occurrence of knocking has been confirmed (step S201).

If it is determined that knocking has occurred (YES in step S201), a knock control amount AKCS is increased by a predetermined value A1 (e.g., 0.4° CA) and updated by the controller 60 (step S202). It is to be noted herein that "° CA" represents "crank angle". On the other hand, if it is determined that knocking has not occurred (NO in step S201), the knock control amount AKCS is reduced by a predetermined value (e.g., 0.01° CA) and updated by the controller 60 (step S203).

The knock control amount AKCS changes in magnitude in accordance with a current circumstance in which knocking occurs in the internal combustion engine 1. More specifically, if knocking has occurred in the internal combustion engine 1, the knock control amount AKCS is set at such a value as makes the required ignition timing Acal a retarded timing. On the contrary, if knocking has not occurred in the internal combustion engine 1, the knock control amount AKCS is set at such a value as makes the required ignition timing Acal an advanced timing. Thus, the knock control amount AKCS is used as a quantity for controlling an ignition timing in accordance with a circumstance in which knocking occurs at each moment.

After the knock control amount AKCS has thus been updated, it is determined whether or not the knock control amount AKCS is larger than a predetermined value A3 (e.g., 2.5° CA) (step S204). If it is determined that the knock control amount AKCS is larger than the predetermined value A3 (YES in step S204), a knock learning amount AGKNK is reduced by a predetermined value A5 (e.g., 0.5° CA) and updated (step S205).

On the other hand, if it is determined that the knock control amount AKCS is equal to or smaller than the predetermined value A3 (NO in step S204), it is further determined whether or not the knock control amount AKCS is smaller than a predetermined value A4 (e.g., 0.5° CA) (step S206). If it is determined that the knock control amount AKCS is smaller than the predetermined value A4 (YES in step S206), the knock learning amount AGKNK is increased by a predetermined value A6 (e.g., 0.5° CA) and updated (step S207).

On the other hand, if it is determined that the knock control amount AKCS is equal to or smaller than the predetermined value A3 and equal to or larger than the predetermined value A4 (NO in step S204 and NO in step S206), a shift to the subsequent processing is made without updating the knock learning amount AGKNK.

If knocking tends to occur frequently, the knock learning amount AGKNK is set at a relatively small value. On the contrary, if knocking seldom occurs, the knock learning amount AGKNK is set at a relatively large value. More specifically, the required ignition timing Acal is set at a timing that is retarded with decreases in the knock learning amount AGKNK.

After the knock learning amount AGKNK has thus been calculated, calculation of a knock retardation reflection amount AKNK based on a circumstance in which knocking occurs is made. First of all, a critical retardation value Akmf as a control limit of the knock retardation reflection amount AKNk is calculated on the basis of an engine rotational speed NE and an engine load fl (step S208).

Then, a critical retardation amount Akmax is calculated as a difference between the base ignition timing Abse and the critical retardation value Akmf according to a formula shown below (step S209).

$$Akmax \leftarrow Akmf - Abse \quad (2)$$

Then, a knock retardation reflection amount AKNK as the reflection amount is calculated on the basis of the critical retardation amount Akmax thus calculated, the knock learning amount AGKNK, and the knock control amount AKCS, according to a formula shown below (step S210).

$$AKNK = Akmax - AGKNK + AKCS \quad (3)$$

Then, a required ignition timing Acal is set by retardatively correcting the ignition timing Abse on the basis of the knock retardation reflection amount AKNK, according to a formula shown below (step S211).

$$Acal = Abse + AKNK \quad (4)$$

After the required ignition timing Acal has thus been set, the present routine is temporarily terminated.

In actually performing control, the required ignition timing Acal thus determined is compared with various ignition timings that are determined during various transitional control operations, and the most retarded one of those ignition timings is selected and defined as a reflected ignition timing Aop. The transitional control operations as mentioned herein include, for example, ignition timing control for reducing a shock resulting from resumption of fuel injection immediately after suspension of fuel supply, ignition timing control for reducing an acceleration shock, and the like.

In a processing different from a series of the aforementioned processings, the electronic control unit 60 controls the driving of the igniter 13 such that an ignition timing of the ignition plug 22 coincides with the reflected ignition timing Aop.

Next, control of determining whether or not knocking has occurred will be described. The knock determiner 60 disposed inside the electronic control unit 60 determines whether or not knocking has occurred. In the first embodiment, on the assumption that peak values (more precisely, logarithmically transformed values thereof) of output signals of the knock sensor 62 during a knock determination period (a period determined by a crank angle) form a normal distribution, a knock determination level is set on the basis of a median and a standard deviation calculated from a probability distribution thereof. It is determined on the basis of this knock determination level whether or not knocking has occurred.

Figure 4:
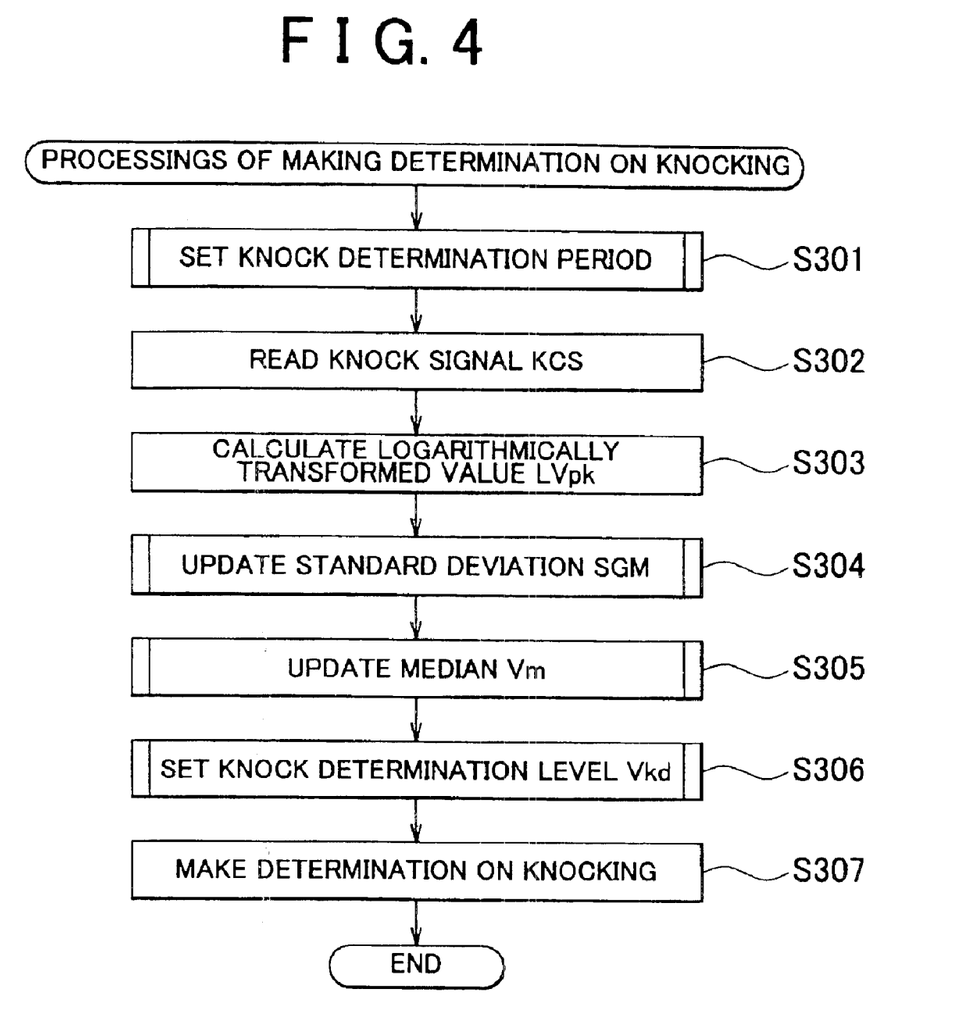
FIG. 4 is a flowchart showing a procedure of knock determination processings.
Figure 5:
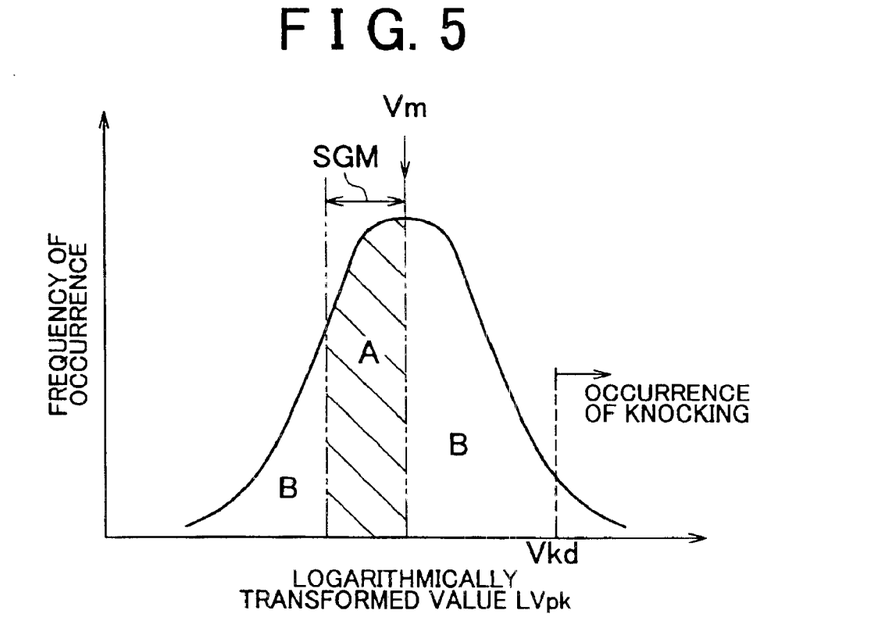
FIG. 5 is a graph showing an exemplary normal distribution that is set in the knock determination processings.

The contents of the processings of making a determination on knocking in this manner will be described hereinafter with reference to FIGS. 4 and 5. FIG. 4 shows a procedure of the knock determination processings performed by the knock determiner 60. A series of these processings are also performed by the electronic control unit 60 as an interruption routine to be executed at intervals of a predetermined period (crank angle). FIG. 5 shows an exemplary normal distribution set by the processings.

First of all in these processings, as shown in FIG. 4, a crank angle at which detection of peak values as mentioned above is started (a determination start timing) and a crank angle at which detection of peak values is terminated (a determination end timing) are set respectively (step S301). A knock determination period, which is determined by the determination start timing and the determination end timing, is basically set as a period in which engine oscillation resulting from the occurrence of knocking can be reliably detected, more specifically, as a period ranging from a late period of a compression stroke to an intermediate period of an expansion stroke.

If a crank angle of the internal combustion engine 1 reaches a value corresponding to the determination start timing due to operation of the internal combustion engine 1, a peak value of an output signal of the knock sensor 62 during a subsequent knock determination period is retained. This peak value is read as a knock signal KCS (step S302).

Then, this knock signal KCS is subjected to logarithmic transformation according to a formula shown below (step S303). In the formula, coefficients "A" and "a" are both arbitrary constants.

$$\text{Logarithmically Transformed Value } LVpk = A \times \text{Log(Knock Signal } KCS/a) \quad (5)$$

Then, as for a normal distribution as shown in FIG. 5 where a standard deviation SGM and a median Vm are defined as initial values, the standard deviation SGM is updated on the basis of the logarithmically transformed value LVpk mentioned above (step S304). More specifically, if the logarithmically transformed value LVpk is within a range "(median Vm−standard deviation SGM) <logarithmically transformed value LVpk<median Vm" (a range A in FIG. 5), the standard deviation SGM is updated according to a formula shown below.

$$\text{Standard Deviation } SGM = \text{Standard Deviation } SGM' \text{ Set Last Time} - 2\alpha \quad (6)$$

As the coefficient "α", a value calculated on the basis of a difference between a logarithmically transformed value LVpk and a median Vm (e.g., a value obtained by dividing a difference between a logarithmically transformed value LVpk and a median Vm by a suitable value) is used.

On the contrary, if the logarithmically transformed value LVpk is outside the aforementioned range A (in a range B shown in FIG. 5), the standard deviation SGM is updated according to a formula shown below.

$$\text{Standard Deviation } SGM = \text{Standard Deviation } SGM' \text{ Set Last Time} + \alpha \quad (7)$$

Then, the median Vm is updated on the basis of the logarithmically transformed value LVpk mentioned above (step S305). More specifically, if the logarithmically transformed value LVpk is within a range "median Vm<logarithmically transformed value LVpk", the median Vm is updated according to a formula shown below.

$$\text{Median } Vm = \text{Median } Vm' \text{ Set Last Time} + \beta \quad (8)$$

As the coefficient "β" as well as the aforementioned coefficient "α", a value calculated on the basis of a difference between a logarithmically transformed value LVpk and a median Vm (e.g., a value obtained by dividing a difference between a logarithmically transformed value LVpk and a median Vm by a suitable value) is used.

On the contrary, if the logarithmically transformed value LVpk is within a range "median Vm≧logarithmically transformed value LVpk", the median Vm is updated according to a formula shown below.

Median Vm=Median Vm' Set Last Time−β  (9)

By thus updating the standard deviation SGM and the median Vm, a normal distribution determined by the standard deviation SGM and the median Vm converges to a normal distribution corresponding to a distribution of the logarithmically transformed value LVpk at each moment.

Then, a knock determination level Vkd is set on the basis of the standard deviation SGM and the median Vm that are thus updated constantly, according to a formula shown below (step S306).

Vkd=Median Vm+u-Value×Standard Deviation SGM×Coefficient k  (10)

The u-value is set within a range of "0 to 3" on the basis of an engine rotational speed NE and an intake air amount GA. The u-value is basically set as a value that increases with increases in the pressure of combustion of the mixture in the combustion chamber 12. The coefficient "k" is a value that is calculated substantially in the same manner as the u-value, and is a coefficient for finely adjusting the knock determination level Vkd.

Then, through a comparison between the knock determination level Vkd and the logarithmically transformed value LVpk mentioned above, it is determined via the knock determiner 60 whether or not knocking has occurred in the internal combustion engine 1 (step S307). That is, if the logarithmically transformed value LVpk is within a range "knock determination level Vkd<logarithmically transformed value LVpk", it is determined that knocking has occurred in the internal combustion engine 1. On the contrary, if the logarithmically transformed value LVpk mentioned above is within a range "knock determination level Vkd≧logarithmically transformed value LVpk", it is determined that knocking has not occurred in the internal combustion engine 1.

By thus making a determination on the occurrence of knocking, it becomes possible to make a determination on knocking in accordance with a distribution of intensity of a logarithmically transformed value LVpk of a knock signal KCS at each moment.

As a result of measurements in various experiments, the inventors have confirmed that the magnitude of engine oscillation resulting from the aforementioned swinging movements of the piston increases if the engine assumes an operational state fulfilling conditions (i) to (iii) which will be stated below.

Condition (i): When Engine Rotational Speed NE is in Intermediate Speed Range

The pressure of combustion temporarily rises in a period ranging from a compression stroke to an expansion stroke, reaches a maximum value, and then falls gradually. In this case, if a period in which the pressure of combustion rises, especially, a period in the vicinity of a timing when a maximum combustion pressure is reached overlaps with a period in which swinging movements occur, the magnitude of engine oscillation resulting from the swinging movements further increases. From the viewpoint of crank angle as a reference, the period in which swinging movements occur is hardly changed by the engine rotational speed NE. On the other hand, the period in which the pressure of combustion rises is shifted to the advancement side with decreases in the engine rotational speed NE, and is shifted to the retardation-side with increases in the engine rotational speed NE. Accordingly, it is considered that the magnitude of oscillation resulting from the swinging movements increases when the engine rotational speed NE is in an intermediate speed range, namely, in a specific rotational speed range where the period in which the pressure of combustion rises overlaps with the period in which swinging movements occur.

Condition (ii): When Engine Load fl is in High Load Range

If the engine load fl is in a high load range, the pressure of combustion increases. Accordingly, it is considered that the magnitude of oscillation resulting from swinging movements increases as well.

Condition (iii): When Ignition Timing is Retarded by Large Amount

Swinging movements of the piston 3 occur in an intermediate period of an expansion stroke. The magnitude of engine oscillation occurring as a result of the swinging movements increases as the pressure of combustion at that moment increases. On the other hand, if the amount of retardation of ignition timing increases, the speed of combustion decreases, so that combustion occurs gently. Therefore, the pressure of combustion in the intermediate period of the expansion stroke tends to increase. Accordingly, it is considered that the magnitude of engine oscillation resulting from swinging movements increases as well with increases in retardation amount of ignition timing.

In the first embodiment, therefore, it is estimated that engine oscillation of a great magnitude is likely to be caused by swinging movements of the piston 3, on the condition that the internal combustion engine 1 assume a specific operational state fulfilling predetermined conditions composed of conditions "a" to "c" stated below.

(Condition "a")

That the engine rotational speed satisfy a relationship "predetermined lower-limit speed NEL<engine rotational speed NE<predetermined upper-limit speed NEH".

(Condition "b")

That the engine load fl satisfy a relationship "engine load fl≧predetermined value flk".

(Condition "c")

That the reflected ignition timing Aop be set at a timing satisfying a relationship "reflected ignition timing Aop≦knock base value Ak−knock retardation reflection amount AKNK+predetermined value α". This condition is grounded on fulfillment of both a condition that the ignition timing be set on the retardation side with respect to a predetermined period and a condition that the amount of retardation be larger than a predetermined amount.

It is to be noted herein that the predetermined lower-limit speed NEL, the predetermined upper-limit speed NEH, the predetermined value flk, and the predetermined value α are set as will be described below. A speed range, a load range, and an ignition timing range regarding an engine rotational speed NE where the intensity of engine oscillation resulting from the swinging movements of the piston 3 may increase above an intensity leading to a decrease in the precision of making determinations in the above-mentioned knock determination processings are calculated through an experiment or the like. Then, the predetermined lower-limit speed NEL, the predetermined upper-limit speed NEH, the predetermined value flk, and the predetermined value α are set as values defining those ranges respectively.

If the internal combustion engine 1 assumes a specific operational state as mentioned herein, the determination end timing of the knock determination period is set as a predetermined crank angle CAk at which a period in which engine oscillation occurs as a result of the swinging movements is suitably inhibited from overlapping with the knock determination period. The determination end timing is set by a setter 60 disposed inside the electronic control unit 60. Thus, such engine oscillation is inhibited from being erroneously detected as oscillation resulting from knocking.

Figure 6:
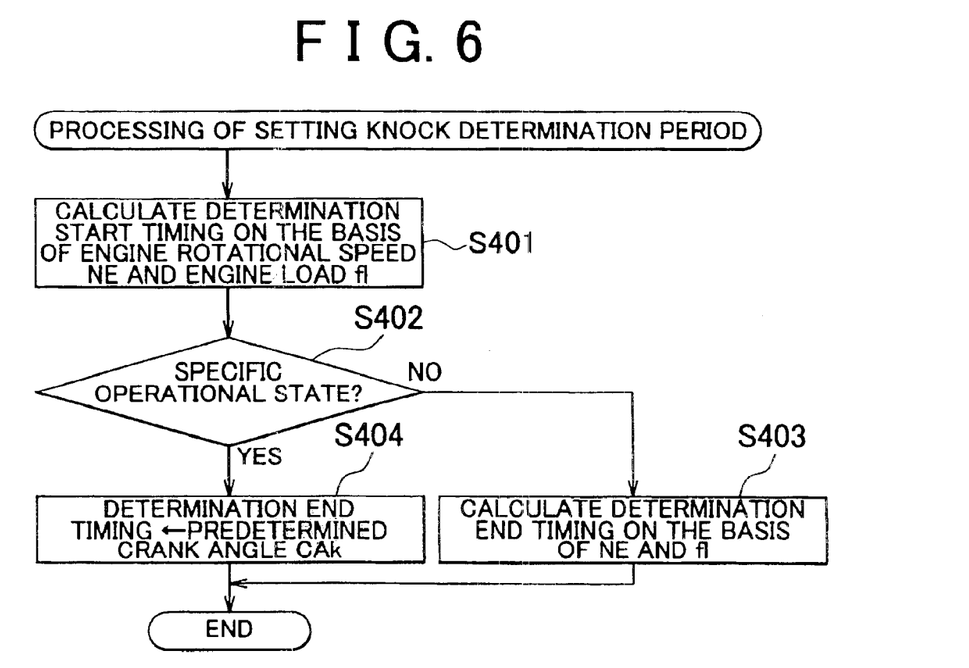
FIG. 6 is a flowchart showing a procedure of processings of setting a knock determination period.

A concrete procedure of the processings of setting a knock determination period will be described hereinafter with reference to FIG. 6.

These processings are performed as the processing in step S301 of the aforementioned knock determination processings. In the processings shown in FIG. 6, first of all, a determination start timing as mentioned above is set through a map calculation based on the engine rotational speed NE and the engine load fl (step S401). The map used in this map calculation is designed to set a determination start timing that makes it possible to reliably detect engine oscillation resulting from the occurrence of knocking.

It is then determined whether or not the internal combustion engine 1 assumes a specific operational state fulfilling all the aforementioned conditions "a" to "c" (step S402). If the internal combustion engine 1 does not assume the specific operational state (NO in step S402), a determination end timing is set through a map calculation based on the engine rotational speed NE and the engine load fl (step S403). The map used in this map calculation is designed to set a detection end period that makes it possible to reliably detect engine oscillation resulting from the occurrence of knocking on the assumption that the influence of engine oscillation resulting from swinging movements is substantially negligible.

On the other hand, if the internal combustion engine 1 assumes the specific operational state (YES in step S402), the predetermined crank angle CAk is set as a determination end timing (step S404). The predetermined crank angle CAk corresponds to a period that makes it possible to suitably inhibit a period in which engine oscillation of a great magnitude occurs from overlapping with a knock determination period in the case where the engine oscillation occurs as a result of the swinging movements of the piston 3. The predetermined crank angle CAk is stored into the electronic control unit 60 in advance after being calculated through an experiment or the like. The predetermined crank angle CAk is always set at a timing advanced with respect to a determination end timing that is set on the basis of an engine rotational speed NE and an engine load fl in the processing in step S403. In the first embodiment, the processing in step S404 functions as an end timing setter 60 that sets a determination end timing as such a timing as reduces a knock determination period.

After the determination end timing has thus been set, the present routine is temporarily terminated. Operation achieved by thus setting a knock determination period will be described hereinafter with reference to FIG. 7.

Figures 7A, 7B:
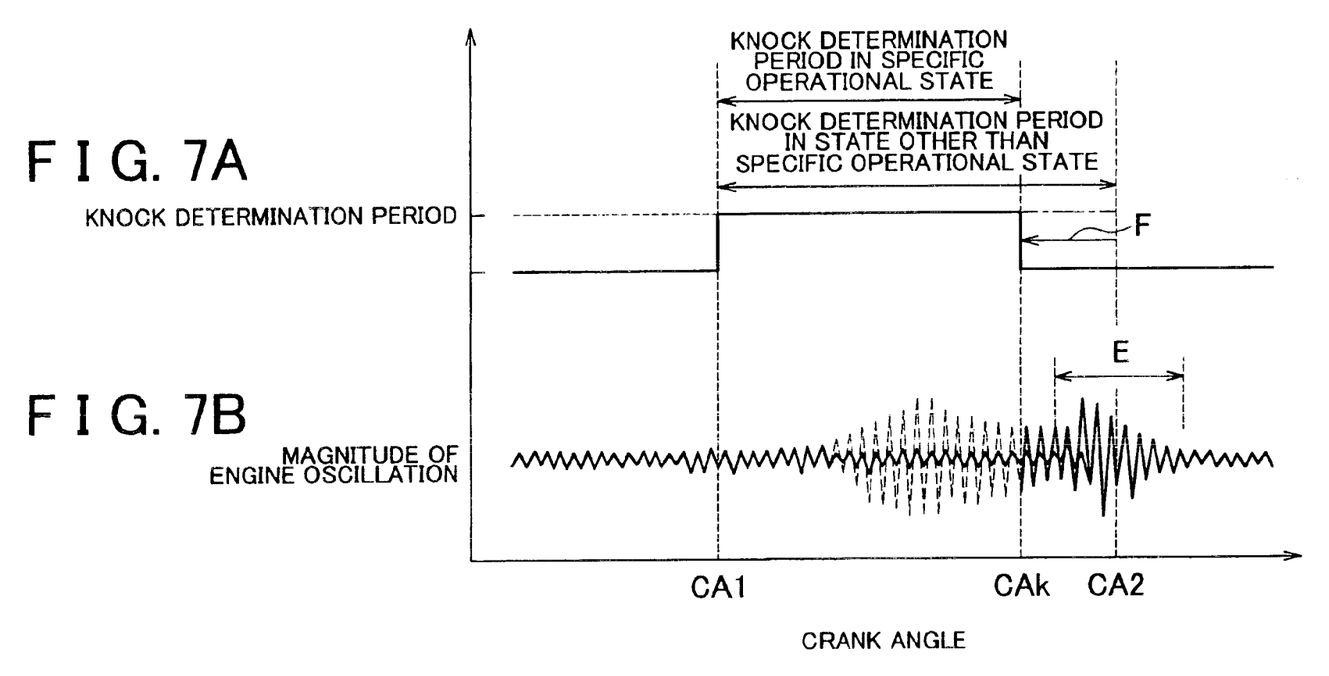
FIGS. 7A and 7B are a timing chart showing an exemplary set state of a knock determination period.

FIG. 7 shows a knock determination period thus set (FIG. 7(a)), and changes in the magnitude of engine oscillation with time. As indicated by a solid line in FIG. 7(a), a start timing of a knock determination period is set, on the basis of an engine rotational speed NE and an engine load fl, as a crank angle CA1 that makes it possible to reliably detect engine oscillation resulting from the occurrence of knocking, regardless of whether or not the internal combustion engine 1 assumes a specific operational state.

As indicated by an alternate long and short dash line in FIG. 7(a), an end timing of a knock determination period is also set, on the basis of an engine rotational speed NE and an engine load fl, as a crank angle CA2 that makes it possible to reliably detect engine oscillation resulting from the occurrence of knocking, if the internal combustion engine 1 does not assume the specific operational state.

On the other hand, as indicated by the solid line in FIG. 7(a), if the internal combustion engine 1 assumes the specific operational state, the determination end timing is set as a predetermined crank angle CAk at which a period in which engine oscillation resulting from swinging movements of the piston 3 occurs (a period E in FIG. 7(b)) is suitably inhibited from overlapping with a knock determination period, regardless of an engine rotational speed NE or an engine load fl. Hence, even in the case where engine oscillation occurs as a result of the swinging movements, this oscillation is prevented from being erroneously detected as oscillation resulting from knocking.

If the internal combustion engine 1 assumes the specific operational state, the determination end timing is set at such a timing as reduces a knock determination period, as indicated by an arrow F in FIG. 7(a). Even in the case where high-intensity oscillation has been caused by the occurrence of knocking as indicated by an alternate long and two short dashes line in FIG. 7(b), it is possible to detect the oscillation.

As described hitherto, the first embodiment achieves the following effects, which will be described below.

(1) In the first embodiment, the predetermined crank angle CAk is set as a determination end timing of a knock determination period on the condition that the condition "c" be fulfilled, namely, on the conditions that the ignition timing be set as a timing that is retarded with respect to a predetermined timing and that the amount of retardation be larger than a predetermined amount. Thus, if there is a possibility that the magnitude of engine oscillation resulting from swinging movements increase, a determination on knock can be terminated before the magnitude of the engine oscillation increases. As a result, an erroneous determination on knocking can be prevented from being made due to the engine oscillation.

(2) In the first embodiment, the condition "a" that the engine rotational speed NE satisfy a relationship "predetermined lower-limit speed NEL<engine rotational speed NE<predetermined upper-limit speed NEH" is set as a condition for setting the predetermined crank angle CAk as a determination end timing. Thus, the predetermined crank angle CAk can be set as a determination end timing while it is accurately grasped, on the basis of an engine rotational speed NE, that the magnitude of engine oscillation resulting from swinging movements is on the increase with a period in which the pressure of combustion rises overlapping with a period in which swinging movements occur.

(3) In the first embodiment, the condition "b" that the engine load fl satisfy a relationship "engine load fl≧predetermined value flk" is set as the setting condition. Thus, the predetermined crank angle CAk can be set as a determination end timing while it is accurately grasped that the magnitude of engine oscillation resulting from swinging movements may increase due to an increase in combustion pressure.

(Second Embodiment)

The second embodiment as a concrete embodiment of a knock control apparatus for an internal combustion engine in accordance with the invention will be described hereinafter. The following description will focus on what is different from the first embodiment.

The second embodiment is different from the first embodiment in that the knock determination level Vkd is increased while the setter 60 sets an end timing of a knock determination period to an advanced timing, if the internal combustion engine 1 assumes the specific operational state.

Figure 8:
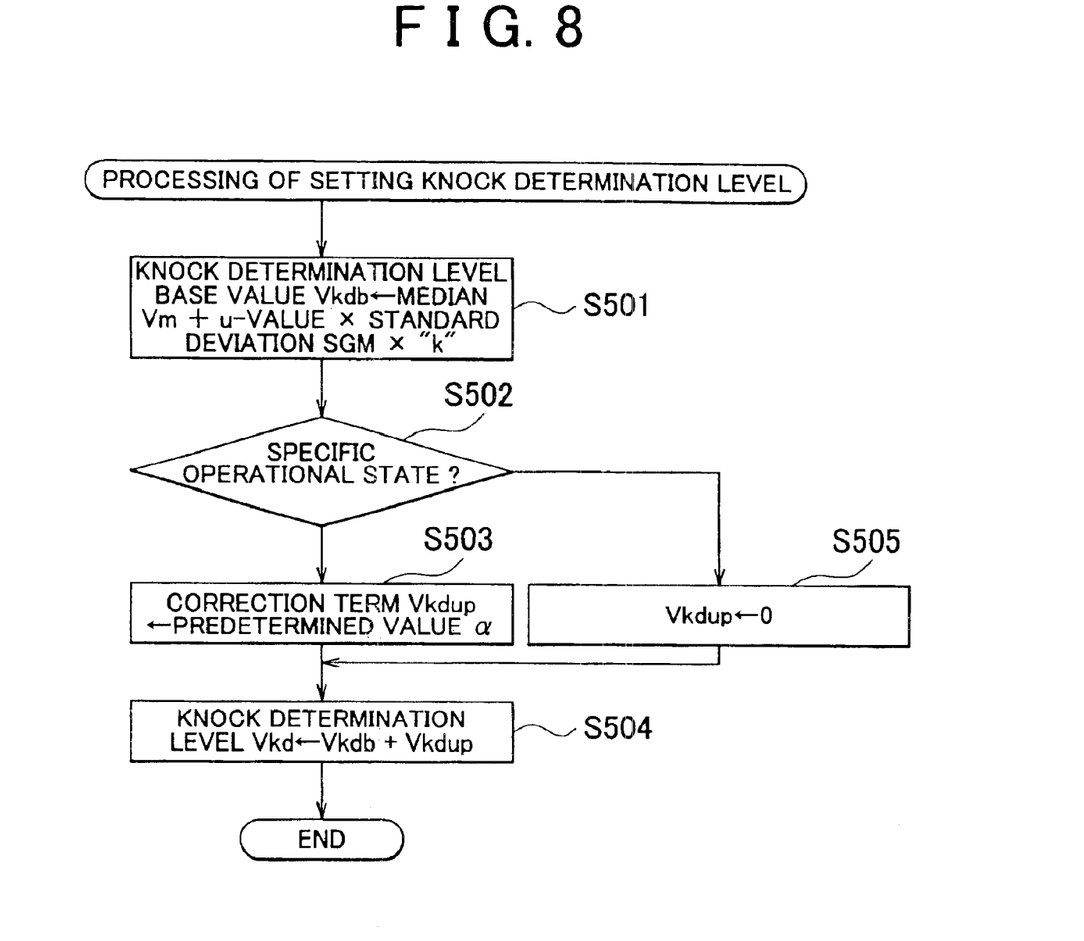
FIG. 8 is a flowchart showing a procedure of setting a knock determination level in accordance with a second embodiment of the invention.

A concrete procedure of the processings of changing the knock determination level Vkd will be described hereinafter with reference to FIG. 8.

These processings are performed as the processing in step S306 of the knock determination processings (FIG. 4) described in detail in the first embodiment. In the processings as shown in FIG. 8, first of all, a knock determination level base value Vkdb is set on the basis of above-mentioned values, namely, the median Vm, the standard deviation SGM, the u-value, and the coefficient "k", according to a formula shown below (step S501).

$$Vkdb = \text{Median } Vm + u\text{-Value} \times \text{Standard Deviation } SGM \times \text{Coefficient "k"} \quad (11)$$

The knock determination level base value Vkdb is set as a value that makes it possible to suitably determine that high-intensity engine oscillation has occurred as a result of the occurrence of knocking.

It is then determined whether or not the internal combustion engine 1 assumes a specific operational state fulfilling all the aforementioned conditions "a" to "c" (step S502). If the internal combustion engine 1 assumes the specific operational state, the predetermined value $\alpha$ is set as a correction term Vkdup (step S503). A knock determination level Vkd is then set by correcting the knock determination level base value Vkdb by the correction term Vkdup as indicated by a formula (12) (step S504).

$$Vkd \leftarrow Vkdb + Vkdup \quad (12)$$

The predetermined value $\alpha$ is designed to increase the knock determination level base value Vkdb so as to prevent engine oscillation resulting from swinging movements of the piston 3 from being erroneously determined as oscillation resulting from the occurrence of knocking, even if the magnitude of the engine oscillation has increased. The predetermined value $\alpha$ is stored into the electronic control unit 60 in advance after being calculated through an experiment or the like. In this case, therefore, even if high-intensity engine oscillation has occurred as a result of swinging movements of the piston 3, a determination that knocking has occurred is inhibited from being made because of the high-intensity engine oscillation. In the second embodiment, the processings in step S503 and step S504 function as a determination level changer 60 (hereinafter referred to as the "changer") disposed inside the electronic control unit 60.

On the other hand, if the internal combustion engine 1 does not assume the specific operational state (NO in step S502), the correction term Vkdup is set as "0" (step S505). Then, a knock determination level Vkd is set according to the formula (12) (step S504). That is, the knock determination level base value Vkdb is set as the knock determination level Vkd at this moment instead of being changed the knock determination level base value via the changer 60 on the ground that engine oscillation resulting from swinging movements of the piston 3 cannot occur or that the intensity of the oscillation does not have an influence on a determination on the occurrence of knocking.

In addition to the aforementioned effects (1) to (3), the second embodiment described above can further achieve the following effect.

(4) In the second embodiment, when the internal combustion engine assumes a specific operational state where the magnitude of engine oscillation resulting from swinging movements of the piston is estimated to increase, the end timing of a knock determination period is set at an advanced timing while the level of knock determination is increased. Accordingly, an erroneous determination ascribable to engine oscillation resulting from swinging movements can be avoided more suitably.

(Other Embodiments)

The aforementioned respective embodiments may be implemented after being modified as will be described below.

In the first embodiment, if the internal combustion engine 1 assumes the specific operational state, the determination end timing of the knock determination period is set at the predetermined crank angle CAk. The invention is not limited thereto. For example, as in step S403 of FIG. 6, it is also appropriate that a determination end timing be calculated on the basis of an engine rotational speed NE and an engine load fl, and that the determination end timing thus calculated be then set at a timing that is advanced by such an amount as can avoid oscillation resulting from swinging movements. In order to prevent engine oscillation resulting from swinging movements of the piston 3 from being erroneously detected as oscillation resulting from knocking, reduction of a knock determination period is effective. However, in order to reliably detect a magnitude of engine oscillation resulting from the occurrence of knocking, it is desirable to maintain a length of the knock determination period that is calculated on the basis of the engine rotational speed NE and the engine load fl. On the other hand, according to the aforementioned construction, for example, the knock determination period is shortened with increases in the possibility of the occurrence of high-intensity engine oscillation resulting from swinging movements of the piston 3, while the knock determination period is held as long as possible if the possibility is low. In this manner, the determination end timing can be set at a timing suited for each moment. Thus, reliable detection of the occurrence of knocking and suppression of erroneous detection can both be achieved appropriately.

In the aforementioned first embodiment, in an internal combustion engine equipped with a known variable valve timing mechanism 50 (FIG. 1) that variably sets timings for opening and closing the intake valve 7 in accordance with an engine operational state, it is also appropriate that the determination start timing of the knock determination period be set on the basis of timings for opening and closing the intake valve 7. According to this construction, engine oscillation resulting from the opening and closing of the intake valve 7 can be suitably inhibited from overlapping with the knock determination period in the vicinity of the determination start timing. Thus, engine oscillation resulting from the opening and closing of the intake valve 7 can also be inhibited from being detected during the knock determination period. As a result, an erroneous determination on the occurrence of knocking can be more suitably inhibited from being made. In an internal combustion engine in which such a variable valve timing mechanism is applied to the exhaust valve 8, if engine oscillation resulting from the opening and closing of the exhaust valve 8 affects a determination on the occurrence of knocking, it is also possible to set the aforementioned determination start timing on the basis of timings for opening and closing the exhaust valve 8.

In the second embodiment, if the internal combustion engine 1 assumes the specific operational state, the knock determination level Vkd is changed by an amount corresponding to the predetermined value $\alpha$. However, the invention is not limited thereto. It is also appropriate that the knock determination level be variably set on the basis of an engine operational state such as an engine rotational speed NE, an engine load fl, an ignition timing or the like. In the case where the knock determination level Vkd is set as a high level that makes it possible to determine upon the occurrence of high-intensity engine oscillation that knocking has occurred, the higher this level becomes, the more reliably an erroneous determination is inhibited from being made due to engine oscillation resulting from the swinging movements. Conversely, however, if engine oscillation of relatively low intensity occurs as a result of the occurrence of knocking, it is impossible to make a determination on the occurrence of the engine oscillation. On the other hand, according to the aforementioned construction, for example, the knock determination level is set at a value that increases with increases in the magnitude of engine oscillation resulting from the aforementioned swinging movements. Thus, the knock determination level Vkd can be set at a more suitable value by being changed at will. Thus, an erroneous determination ascribable to detection of an intensity of engine oscillation resulting from the swinging movements and a fall in knock-determination precision ascribable to such an erroneous determination can both be suppressed suitably.

In the aforementioned respective embodiments, among the conditions "a" to "c" for determining that the internal combustion engine 1 assumes the specific operational state, the condition regarding the reflected ignition timing Aop (the condition "c") can be suitably changed. In short, what counts herein is to be able to reliably determine that the reflected ignition timing Aop is set as a timing when engine oscillation resulting from swinging movements of the piston 3 tends to exhibit high intensity. The method applied to each of the embodiments so as to control ignition timing can also be modified suitably.

In the aforementioned respective embodiments, the occurrence of engine oscillation resulting from swinging movements of the piston 3 is estimated only if the condition "a" regarding the engine rotational speed NE, the condition "b" regarding the engine load fl, and the condition "c" regarding ignition timing are all fulfilled. On the other hand, the occurrence of engine oscillation resulting from swinging movements of the piston 3 may be estimated upon fulfillment of the condition "c" alone, the conditions "c" and "b", or the conditions "c" and "a".

In addition, the condition "c" is so defined as to monitor both the knock base value Ak and the knock retardation reflection amount AKNK. However, the aforementioned estimation can also be made, for example, by simply monitoring largeness of the knock retardation reflection amount AKNK, namely, largeness of a retardation amount in performing ignition timing retardation control for suppressing knocking.

As an estimation parameter to be used in making this estimation, an air-fuel ratio of the mixture serving for combustion in an internal combustion engine may also be used additionally. This construction can be realized by determining that the internal combustion engine assumes the specific operational state, upon fulfillment of not only all the aforementioned conditions "a" to "c" but also a condition "d" "that the air-fuel ratio of the mixture be shifted to the rich side with respect to a predetermined ratio". In general, in an air-fuel ratio range suited for operation of an internal combustion engine, the pressure of combustion during an expansion stroke thereof increases as the air-fuel ratio of the mixture serving for combustion is shifted to the rich side. According to the construction as described above wherein air-fuel ratio is additionally used to estimate a magnitude of engine oscillation resulting from swinging movements of the piston 3, the pressure of combustion can be estimated with higher precision.

As an estimation parameter to be used in making the aforementioned estimation, an engine temperature can also be used. This construction can be realized by adding a condition "e" "that the engine temperature be equal to or lower than a predetermined temperature" to the conditions for determining that the internal combustion engine assumes the specific operational state. The magnitude of friction in operating regions of an internal combustion engine increases with falls in temperature of the engine. Swinging movements of the piston 3 also tend to become precipitous. As a result, the magnitude of engine oscillation also tends to increase. Thus, according to the construction as described above wherein engine temperature is additionally used in estimating an intensity of engine oscillation resulting from the aforementioned swinging movements, the magnitude of the engine oscillation can be estimated with higher precision. As an engine temperature, a temperature suitably reflecting an engine temperature, for example, a temperature of engine coolant, a temperature of lubricating oil, or the like can be used.

In the aforementioned embodiments, the end timing of the knock determination period is set at an advanced timing, so that the knock determination period is shortened. However, the length of the knock determination period may be held as it is, for example, by setting
not only the end timing but also the start timing to an advanced timing.

In the aforementioned respective embodiments, the method of making a determination on the occurrence of knocking may be modified suitably as long as the modified method is designed to detect an intensity of engine oscillation during a preset knock determination period and to determine, on the basis of a comparison between the detected intensity of the oscillation and a preset knock determination level, whether or not knocking has occurred.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A knock control apparatus for an internal combustion engine, comprising:
   a knock determiner that determines that knocking has occurred, if an intensity of engine oscillation detected during a predetermined knock determination period is equal to or higher than a predetermined knock determination level;
   a retardation amount controller that controls a retardation amount of ignition timing on the basis of a result of the determination; and
   a setter that sets an end timing of the knock determination period at an advanced timing on the basis of the ignition timing retardation amount controlled by the controller.

2. The knock control apparatus according to claim 1, wherein the setter sets the end timing on the condition that the ignition timing retardation amount be equal to or larger than a predetermined amount.

3. The knock control apparatus according to claim 1, wherein the setter sets the end timing additionally on the basis of an engine rotational speed.

4. The knock control apparatus according to claim 1, wherein the setter sets the end timing additionally on the basis of an engine load.

5. The knock control apparatus according to claim 1, wherein the setter sets the end timing additionally on the basis of an air-fuel ratio of a mixture serving for combustion in the internal combustion engine.

6. The knock control apparatus according to claim 1, wherein the setter sets the end timing additionally on the basis of an engine temperature.

7. The knock control apparatus according to claim 1, wherein the setter sets the end timing if the internal combustion engine assumes a specific operational state.

8. The knock control apparatus according to claim 7, wherein the specific operational state is a state fulfilling at least one of a condition that the ignition timing retardation amount be equal to or larger than a predetermined amount, a condition that the engine rotational speed be within a predetermined speed range, a condition that the engine load be equal to or higher than a predetermined load, a condition that the air-fuel ratio of the mixture be on the rich side with respect to a predetermined ratio, and a condition that the engine temperature be equal to or lower than a predetermined temperature.

9. The knock control apparatus according to claim 1, further comprising: a changer that changes the knock determination level simultaneously with the setting of the end timing.

10. The knock control apparatus according to claim 9, wherein the changer increases the knock determination level.

11. A knock control method for an internal combustion engine, comprising the steps of:

determining that knocking has occurred, if an intensity of engine oscillation detected during a predetermined knock determination period is equal to or higher than a predetermined knock determination level;

controlling a retardation amount of ignition timing on the basis of a result of the determination; and setting an end timing of the knock determination period at an advanced timing on the basis of the ignition timing retardation amount controlled in the above step.

12. The knock control method according to claim 11, wherein the end timing is set on the condition that the ignition timing retardation amount be equal to or larger than a predetermined amount.

13. The knock control method according to claim 11, wherein the end timing is set additionally on the basis of an engine rotational speed.

14. The knock control method according to claim 11, wherein the end timing is set additionally on the basis of an engine load.

15. The knock control method according to claim 11, wherein the end timing is set additionally on the basis of an air-fuel ratio of a mixture serving for combustion in the internal combustion engine.

16. The knock control method according to claim 11, wherein the end timing is set additionally on the basis of an engine temperature.

17. The knock control method according to claim 11, wherein the end timing is set if the internal combustion engine assumes a specific operational state.

18. The knock control method according to claim 17, wherein the specific operational state is a state fulfilling at least one of a condition that the ignition timing retardation amount be equal to or larger than a predetermined amount, a condition that the engine rotational speed be within a predetermined speed range, a condition that the engine load be equal to or higher than a predetermined load, a condition that the air-fuel ratio of the mixture be on the rich side with respect to a predetermined ratio, and a condition that the engine temperature be equal to or lower than a predetermined temperature.

19. The knock control method according to claim 17, further comprising the step of:

changing the knock determination level simultaneously with the setting of the end timing.

20. The knock control method according to claim 19, wherein the knock determination level is increased.

* * * * *